US006505928B1

(12) United States Patent
Landau et al.

(10) Patent No.: US 6,505,928 B1
(45) Date of Patent: Jan. 14, 2003

(54) METHODS AND APPARATUS FOR INK JET PRINTING WITH FORCED AIR DRYING

(75) Inventors: Arthur Landau, Brewster; Clement Onyenemezu, Bronx; Keng Lau, Brooklyn, all of NY (US)

(73) Assignee: Digital Printing Systems, LLC, Orangeburg, NY (US)

( * ) Notice: Subject to any disclaimer, the term of this patent is extended or adjusted under 35 U.S.C. 154(b) by 0 days.

(21) Appl. No.: 09/570,890

(22) Filed: May 15, 2000

(51) Int. Cl.[7] ......................... G03B 27/06; F26B 19/00; F26B 25/00; F26B 25/06

(52) U.S. Cl. ......................................... 347/102; 34/633

(58) Field of Search ........................... 347/102; 399/92; 34/633

(56) References Cited

U.S. PATENT DOCUMENTS

| | | | | |
|---|---|---|---|---|
| 4,128,345 | A | 12/1978 | Brady | 400/120 |
| 4,340,893 | A | 7/1982 | Ort | 347/102 |
| 5,020,244 | A | 6/1991 | Smith | 34/155 |
| 5,317,127 | A | 5/1994 | Brewster, Jr. et al. | 219/388 |
| 5,528,271 | A | 6/1996 | Ebisawa | 347/34 |
| 5,757,407 | A | 5/1998 | Rezanka | 347/102 |
| 5,769,930 | A | 6/1998 | Sano et al. | 106/31.36 |
| 5,772,746 | A | 6/1998 | Sawada et al. | 106/31.86 |
| 5,774,141 | A | 6/1998 | Cooper et al. | 347/34 |
| 5,788,754 | A | 8/1998 | Deardurff et al. | 106/31.58 |
| 5,831,655 | A | 11/1998 | Asawa et al. | 347/102 |
| 5,851,590 | A | 12/1998 | Donovan et al. | 427/265 |
| 5,853,469 | A | 12/1998 | Colt et al. | 106/31.49 |
| 5,853,899 | A | 12/1998 | Anderson et al. | 428/507 |
| 5,871,572 | A | 2/1999 | Marritt | 106/31.36 |
| 5,918,545 | A | 7/1999 | Pym | 101/424 |

*Primary Examiner*—John Barlow
*Assistant Examiner*—Alfred E Dudding
(74) *Attorney, Agent, or Firm*—Galgano & Burke

(57) ABSTRACT

Apparatus and methods for applying drying air to a printed substrate during each pass of a print head over the substrate. Preferred embodiments of the present invention direct heated air onto the printed substrate and then draw that heated air away from the proximity of the substrate with a vacuum.

31 Claims, 4 Drawing Sheets

METHODS AND APPARATUS FOR INK JET PRINTING WITH FORCED AIR DRYING

The present invention relates to methods and apparatus for ink jet printing and, more particularly, to methods and apparatus for ink jet printing which apply drying air to a printed substrate.

BACKGROUND

The present invention is directed to improvements in methods of ink jet printing. Those skilled in the art will appreciate that ink jet printers typically comprise an ink jet having a plurality of ink nozzles which propel, i.e., print, ink onto a substrate spaced a slight distance from the ink jet nozzles. Many modern ink jet printers comprise reciprocating print heads and mechanisms for driving the substrate. The print head is typically reciprocated along an axis perpendicular to the direction of travel of the substrate.

It is generally desirable to print clearly and quickly, however, these two parameters are often conflicting since the quicker the printing process proceeds, the less time that the printed ink will have to set, i.e., sufficiently dry, prior to the next pass of the print head in order to prevent puddling or bleeding of the ink droplets. If the ink droplets from previous passes has not yet set sufficiently on the substrate, then the application of successive rows of ink droplets will tend to cause puddling, bleeding and resultant image distortion. Therefore, it is desirable to have printed ink droplets sufficiently set prior to subsequent passes of the print head.

Previous devices have disclosed various methods for drying printed substrates. For example, some prior art devices apply heat to one or more drums over which a substrate passes after it has been printed. Other devices direct heated air onto the printed substrate. One disadvantage of applying heated air in the vicinity of the print head is that the heat tends to clog the ink jet nozzles. Therefore, while hot air accelerates ink drying on the substrate, it also accelerates ink drying on the print head ink jet nozzles which can then tend to become clogged with dried ink.

It would therefore be desirable to provide a system for rapidly drying a printed substrate a very short time after each printing pass of a print head while minimizing the deleterious effects of applying heat to the ink jet nozzles.

SUMMARY OF THE INVENTION

The various embodiments of the present invention are directed to apparatus and methods for applying drying air to a printed substrate during each pass of a print head over the substrate. Preferred embodiments of the present invention direct heated air onto the printed substrate and then draw that heated air away from the proximity of the substrate with a vacuum.

One preferred embodiment of the present invention comprises a heated air nozzle, preferably comprising a plurality of elongated hot air outlets, all of which are substantially surrounded by a vacuum. This drying head is advantageously mounted on or in tandem with a reciprocating print head such that heated air is first directed onto the printed substrate and then immediately drawn away from the substrate with a vacuum during each pass of the reciprocating print head.

One advantage of the embodiments of the present invention is that they enable the use of slower drying inks than would otherwise be employed for a particular printing process.

DETAILED DESCRIPTION

Figure 1:
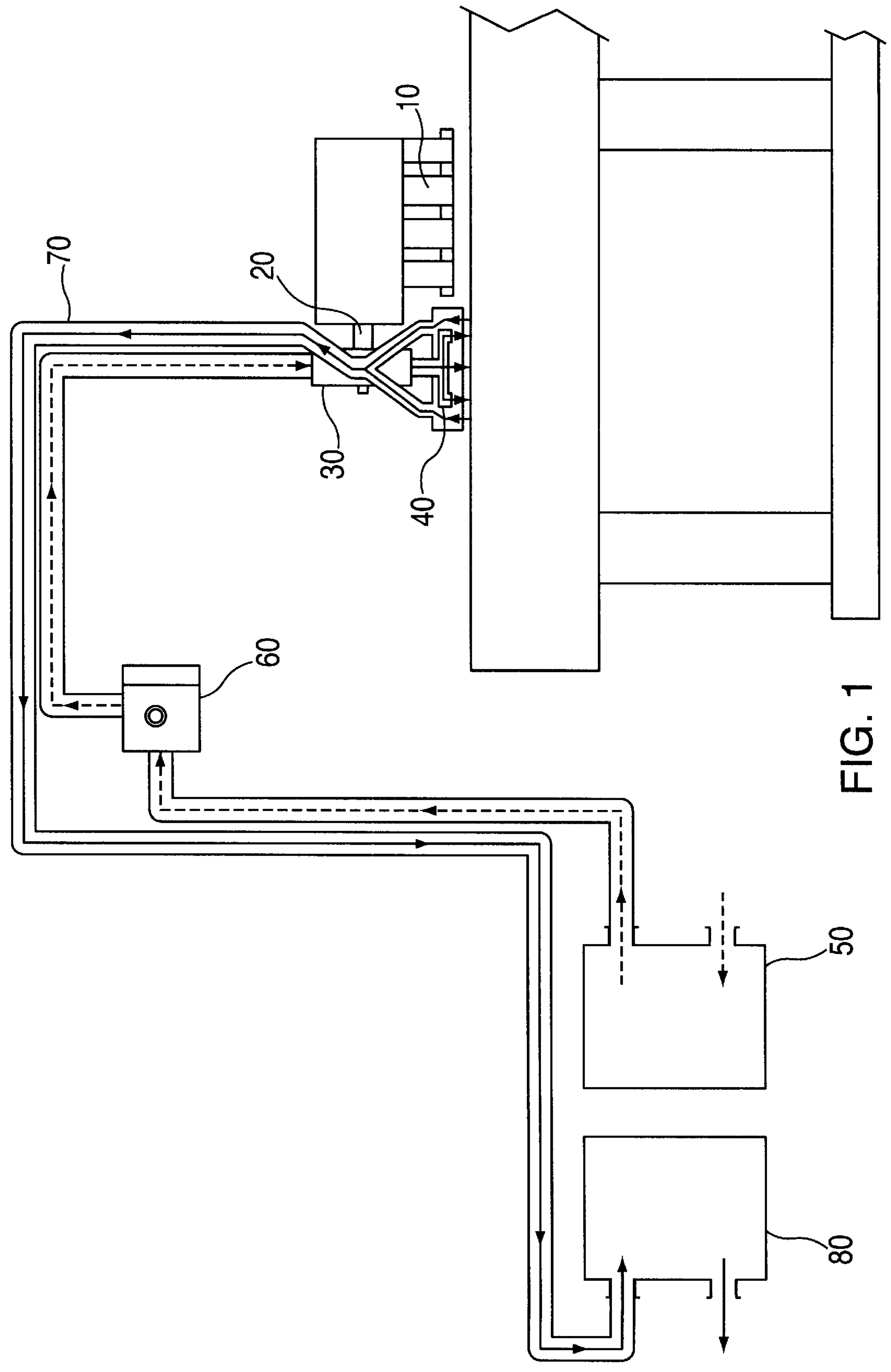
FIG. 1 is a schematic view of one embodiment of the present invention.

The various embodiments of the present invention relate to apparatus and methods for ink jet printing wherein drying gas, preferably heated air, is directed and then drawn away from a printed substrate. As schematically illustrated in FIG. 1, according to one embodiment of the present invention, an ink jet printer comprises print heads 10 mounted on a reciprocating arm 20. Additionally, a heating element 30 and drying head 40 are also advantageously mounted on the reciprocating arm. The drying head advantageously supplies heated air to the printed substrate and simultaneously removes the heated air.

Removal of the drying air from the print surface provides several advantages. As noted above, it is desirable to minimize and preferably avoid the application of heat to the print head ink jets nozzles since heat has a tendency to cause the ink in the small ink jets to dry thereby clogging the jets. Secondly, it is desirable to minimize the turbulence of air across wet ink. Since preferred embodiments of the present invention draw air from substantially all directions around the drying air nozzles, the drying air preferably does not all flow in a single direction. In this manner, the resultant force of the drying air on the printed substrate in any given direction is reduced and the tendency to cause a forced migration of the printed ink is minimized. Additionally, by removing the heated drying air/gas from the proximity of the printed substrate this air/gas can be properly vented, and the vapors, moisture and heat which is removed will not interfere with other elements of the ink jet printer.

As schematically illustrated in FIG. 1, cool air denoted by dashed lines is forced by a air blower 50 through suitable air flow controls 60, to a heating element 30. The air entering heating element 30 is then heated, as illustrated by solid lines in FIG. 1. This heated air is directed through drying head 40 to the printed substrate and is then drawn back into the drying head 40 through exhaust conduit 70 via vacuum pump 80.

While this illustrated embodiment comprises a single drying head 40 on one side of the print head 10, it is also within the scope of the present invention to provide a plurality of drying heads on one or more sides of the print head. It is also within the scope of the present invention to provide independent support for the drying heads 40.

Figure 2:
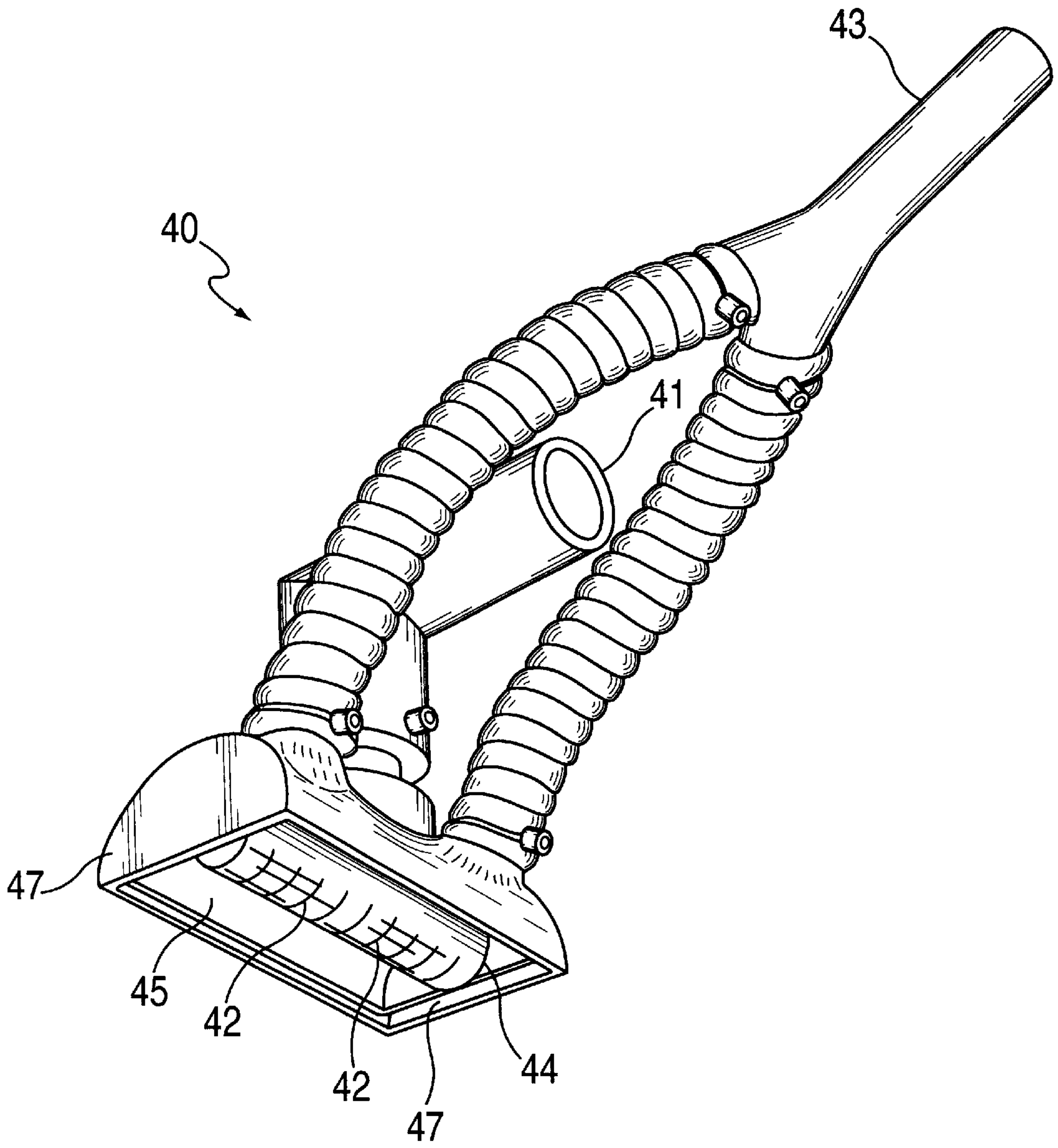
FIG. 2 illustrates a drying head of one embodiment of the present invention.

In accordance with another aspect of the present invention, a drying head provides a vacuum for removing heated drying air from the proximity of the printed substrate through vacuum ports which substantially surround at least one, and preferably a plurality of hot air outlets. As illustrated in FIG. 2, a drying head 40 comprises a hot air intake conduit 41 and a branched exhaust conduit 43. Dehydrated or atmospheric heated air enters intake conduit 41 and is directed through elongated slots 42 in drying nozzle 44 onto the printed substrate. Simultaneously, the heated air is drawn away from the printed substrate through a vacuum slot defined by baffle 45 and the inner wall of the drying head housing 47. The exhaust slot defined by baffle 45 and drying head housing 47 preferably extends uninterrupted around the entire drying nozzle 44 in this preferred embodiment. The heated air is then directed away from the printing area via branched exhaust conduit 43. From the present description, those skilled in the art will appreciate that the use of a branched conduit advantageously enhances the uniformity of the vacuum pressure along the entire vacuum orifice.

The preferred illustrated embodiment shown in FIG. 2 comprises a plurality of elongated slots which are positioned in the same direction as the movement of the substrate, and perpendicular to the path of the print head.

Figure 3:
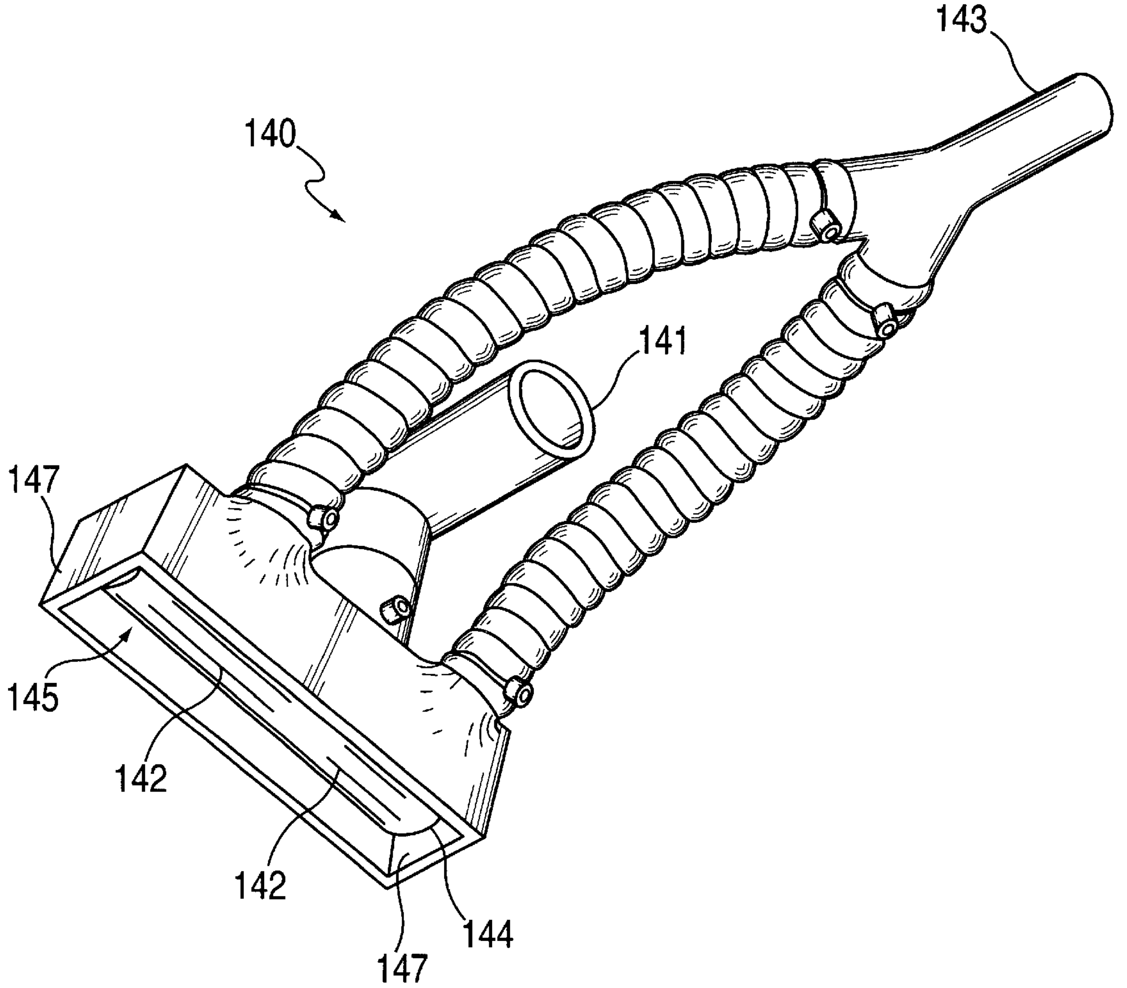
FIG. 3 illustrates a drying head of another embodiment of the present invention.

An alternative embodiment of the present invention is illustrated in FIG. 3 wherein a drying head 140 comprises a hot air intake conduit 141 and a branched exhaust conduit 143. Dry heated air enters intake conduit 141 and is directed through elongated slots 142 in drying nozzle 144 onto the printed substrate. Simultaneously, the heated air is drawn away from the printed substrate through a vacuum slot defined by baffle 145 and the inner wall of the drying head housing 147. The heated air is then directed away from the printing area via branched exhaust conduit 143. In this alternative embodiment of the present invention, a plurality of elongated slots 142 are positioned substantially perpendicular to the path of travel of the printed substrate, i.e., parallel to the path of the reciprocating print head.

Figure 4:
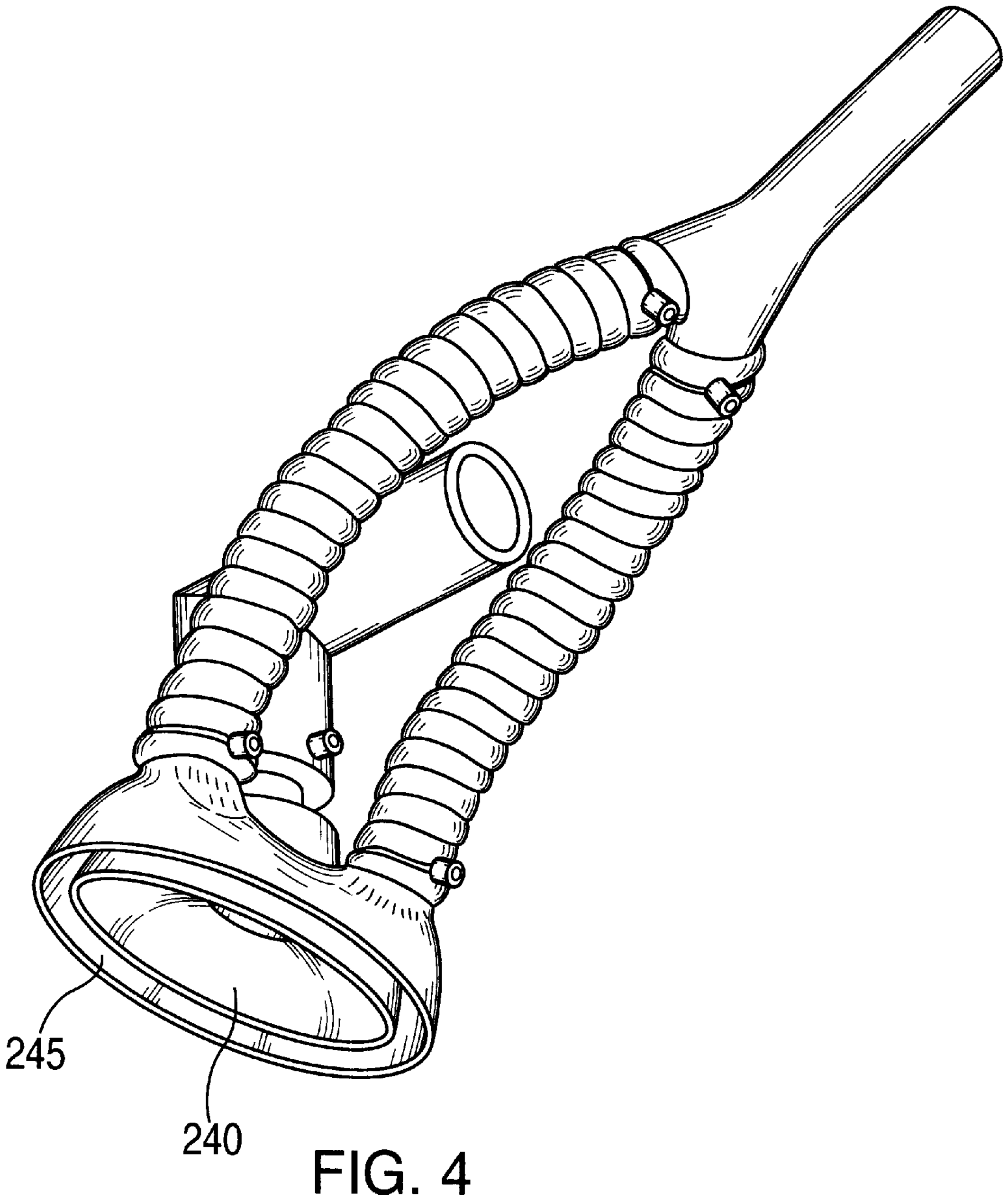
FIG. 4 illustrates a drying head of a still further embodiment of the present invention.

FIG. 4 illustrates a still further embodiment of the present invention wherein a simplified oval hot air nozzle 240 directs heated, drying air to a printed substrate and the heated air is subsequently removed through vacuum orifice 245.

Other embodiments of the present invention comprise methods of ink jet printing onto a substrate comprising the steps of printing ink onto a substrate with a reciprocating print head, directing drying air onto the printed substrate following each pass of the print head and simultaneously suctioning the drying air away from the printed substrate from locations on at least two spaced apart sides of a drying head which contains the drying nozzle. According to preferred methods of the present invention, a vacuum port surrounds at least a portion of the drying nozzle, more preferably surrounds a major portion of the drying nozzle and most preferably substantially surrounds the entire drying nozzle. The drying air is preferably directed onto the printed substrate from a reciprocating drying head which moves in tandem or is actually mounted on the same reciprocating support as the printing head. According to other preferred aspects of the present invention, the drying air is preferably heated and/or humidity controlled.

Another preferred embodiment of the present invention comprises a method wherein the step of blowing heated drying air onto a printed substrate is performed with a nozzle having at least one and preferably a plurality of elongated slots. The elongated slots are preferably perpendicular to the direction of substrate advancement.

What is claimed is:

1. An ink jet printer for passing ink to a substrate comprising:

a reciprocating print head comprising an ink jet nozzle for printing ink to a substrate;

a drying head comprising:

at least one hot air nozzle for directing hot drying air to a printed substrate; and a vacuum nozzle for drawing said heated drying air away from said printed substrate, said vacuum nozzle extending around at least a major portion of said hot air nozzle.

2. An ink jet printer according to claim 1 wherein said drying head reciprocates in tandem with said print head.

3. An ink jet printer according to claim 1 further comprising a reciprocating support and wherein said drying head is mounted on said support with said print head.

4. An ink jet printer according to claim 1 wherein said drying head reciprocates across the printed substrate.

5. An ink jet printer according to claim 1 wherein said vacuum nozzle extends substantially entirely around said hot air nozzle.

6. An ink jet printer according to claim 1 further comprising means for heating said drying air.

7. An ink jet printer according to claim 6 comprising a plurality of said air nozzles.

8. An ink jet printer according to claim 7 wherein said plurality of air nozzles are positioned within a single vacuum nozzle.

9. An ink jet printer according to claim 7 wherein said plurality of air nozzles are elongated and comprise a major axis which is substantially perpendicular to the direction of movement of said substrate.

10. An ink jet printer according to claim 7 wherein said plurality of air nozzles are elongated and comprise a major axis which is substantially parallel to the direction of movement of said substrate.

11. An ink jet printer according to claim 1 comprising a plurality of said air nozzles.

12. An ink jet printer according to claim 11 wherein said plurality of air nozzles are positioned within a single vacuum nozzle.

13. An ink jet printer according to claim 11 wherein said plurality of air nozzles are elongated and comprise a major axis which is substantially perpendicular to the direction of movement of said substrate.

14. An ink jet printer according to claim 11 wherein said plurality of air nozzles are elongated and comprise a major axis which is substantially parallel to the direction of movement of said substrate.

15. An ink jet printer according to claim 1 further comprising means for directing infrared radiation on said printed substrate.

16. An ink jet printer according to claim 1 comprising a plurality of said vacuum nozzles, each of said vacuum nozzles extending around at least a portion of an air nozzle.

17. An ink jet printer according to claim 1 further comprising additional means for applying heat to said printed substrate.

18. An ink jet printer according to claim 1 further comprising additional means for applying heat to said printed substrate.

19. An ink jet printer according to claim 1 where said drying head is mounted on said print head.

20. A method of ink jet printing onto a substrate comprising the steps of:

providing an ink jet printer with a printing head and a drying head wherein said drying head comprises means for directing drying air onto a printed substrate and means for removing said drying air from the region proximate the printed substrate, said air removing means extending around a major portion of said air directing means;

printing ink onto a substrate with a reciprocating print head;

directing drying air onto the printed substrate following each pass of the print head and simultaneously suctioning the drying air away from the printed substrate.

21. A method of ink jet printing onto a substrate according to claim 20 wherein said step of providing a drying head comprises a plurality of drying nozzles.

22. A method of ink jet printing onto a substrate according to claim 20 wherein said drying head comprises a vacuum port.

23. A method of ink jet printing onto a substrate according to claim 20 wherein said vacuum port surrounds at least a portion of the drying nozzle.

24. A method of ink jet printing onto a substrate according to claim 20 wherein said air removing means substantially surrounds the entire drying air directing means.

25. A method of ink jet printing onto a substrate according to claim 20 wherein said drying head comprises a nozzle with a plurality of elongated slots.

26. A method of inkjet printing onto a substrate according to claim 20 wherein said drying head comprises an elongated slot which is substantially parallel to the direction of advancement of the substrate.

27. An ink jet printer for passing ink to a substrate comprising:

a reciprocating print head comprising an ink jet nozzle for printing ink to a substrate;

a drying head comprising:

at least one air nozzle for directing drying air to a printed substrate, wherein said air nozzle is elongated and comprises a major axis which is substantially perpendicular to the direction of movement of said substrate; and a vacuum nozzle for drawing said drying air away from said printed substrate, said vacuum nozzle extending around at least a portion of said hot air nozzle.

28. An ink jet printer according to claim 27 comprising a plurality of said air nozzles.

29. An ink jet printer for passing ink to a substrate comprising:

a reciprocating print head comprising an ink jet nozzle for printing ink to a substrate;

a drying head comprising:

at least one hot air nozzle for directing hot drying air to a printed substrate;

a vacuum nozzle for drawing said heated drying air away from said printed substrate, said vacuum nozzle extending around at least a portion of said hot air nozzle; and additional means for applying heat to said printed substrate.

30. An ink jet printer according to claim 29 wherein said additional means for applying heat comprises means for directing infrared radiation on said printed substrate.

31. A method of ink jet printing onto a substrate comprising the steps of:

providing an ink jet printer with a printing head and a drying head wherein said drying head comprises means for directing drying air onto a printed substrate comprising a nozzle with at least one elongated slot which is substantially perpendicular to the direction of advancement of a substrate, and means for removing said drying air from the region proximate the printed substrate;

printing ink onto a substrate with a reciprocating print head;

directing drying air onto the printed substrate following each pass of the print head and simultaneously suctioning the drying air away from the printed substrate.

* * * * *